US008898514B2

(12) United States Patent
Myrah et al.

(10) Patent No.: US 8,898,514 B2
(45) Date of Patent: Nov. 25, 2014

(54) SAS STORAGE DEVICE DRIVE SYSTEM WITH FAILURE INFORMATION TABLE

(75) Inventors: Michael G Myrah, Cypress, TX (US); Balaji Natrajan, Spring, TX (US); Brian M Spencer, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 172 days.

(21) Appl. No.: 13/532,287

(22) Filed: Jun. 25, 2012

(65) Prior Publication Data

US 2013/0346791 A1    Dec. 26, 2013

(51) Int. Cl.
*G06F 11/00*    (2006.01)

(52) U.S. Cl.
USPC .......................................... 714/6.2; 714/6.21

(58) Field of Classification Search
USPC .................................................. 714/6.2, 6.21
See application file for complete search history.

(56) References Cited

U.S. PATENT DOCUMENTS

| 7,188,201 | B2 * | 3/2007 | Harima et al. ................. 710/104 |
| 7,249,277 | B2 * | 7/2007 | Arai et al. ..................... 714/6.21 |
| 7,308,534 | B2 * | 12/2007 | Mimatsu ....................... 711/114 |
| 7,353,434 | B2 * | 4/2008 | Fujimoto ........................ 714/54 |
| 7,386,758 | B2 * | 6/2008 | Kitamura ..................... 714/6.21 |
| 7,913,037 | B2 * | 3/2011 | Nakajima et al. ............. 711/114 |
| 7,917,682 | B2 | 3/2011 | Baktavathsalam |
| 8,046,536 | B2 | 10/2011 | Mimatsu |
| 8,099,532 | B2 | 1/2012 | Cagno et al. |
| 8,689,044 | B2 * | 4/2014 | Natrajan et al. ............... 714/6.3 |
| 2007/0064623 | A1 | 3/2007 | Brahmaroutu |
| 2007/0299951 | A1 | 12/2007 | Krithivas |
| 2007/0299952 | A1 | 12/2007 | Goodman et al. |
| 2009/0106603 | A1 * | 4/2009 | Dilman et al. .................. 714/42 |
| 2010/0125763 | A1 * | 5/2010 | Yamamoto et al. ............. 714/54 |
| 2010/0293412 | A1 * | 11/2010 | Sakaguchi et al. ............. 714/17 |
| 2013/0007511 | A1 * | 1/2013 | Gaertner et al. ............. 714/6.22 |

OTHER PUBLICATIONS

Oracle, Sun Blade Storage Module M2 Administration Guide, Dec. 2010, Oracle, Revision A.*

* cited by examiner

*Primary Examiner* — Scott Baderman
*Assistant Examiner* — Paul Contino
(74) *Attorney, Agent, or Firm* — Arthur Ortega

(57) ABSTRACT

A SAS storage enclosure to provide storage drive information that includes an expander and a storage manager. The expander supports communication between initiators and associated zoned storage drives of the storage enclosure, and the storage drive information table is to store extended storage drive status information of storage drives of the storage enclosure. The storage manager is to store to the storage drive information table extended storage drive status information of storage drives of the storage enclosure in response to receipt from an initiator a SAS command to store the information, in the event that the storage manager receives from an initiator a command to exchange data with a zoned storage drive and then a storage drive failure occurs with the zoned storage drive. The storage manager sends to the initiator the information in response to receipt from an initiator a SAS command to retrieve the information.

20 Claims, 3 Drawing Sheets

SAS STORAGE DEVICE DRIVE SYSTEM WITH FAILURE INFORMATION TABLE

BACKGROUND

Serial attached small computer system interface (SAS) is a communication protocol for enabling communication between computer devices. In the SAS protocol, SAS devices include initiator devices, target devices, and expander devices. Initiator devices are devices that can begin a SAS data transfer, while target devices are devices to which initiator devices can transfer data. Expander devices are devices that can facilitate data transfer between multiple initiator devices and multiple target devices. The SAS protocol utilizes a point-to-point bus topology. Therefore, if an initiator device is required to connect to multiple target devices, a direct connection can be established between the initiator device and each individual target device to facilitate each individual data transfer between the initiator device and each individual target device. A SAS switch is a SAS device that can include expander devices which can manage the connections and data transfer between multiple initiator devices and multiple target devices. A SAS fabric can include a network of initiator devices, target devices and expander devices.

BRIEF DESCRIPTION OF THE DRAWINGS

Certain examples are described in the following detailed description and in reference to the drawings, in which.

DETAILED DESCRIPTION OF SPECIFIC EXAMPLES

Figure 1:
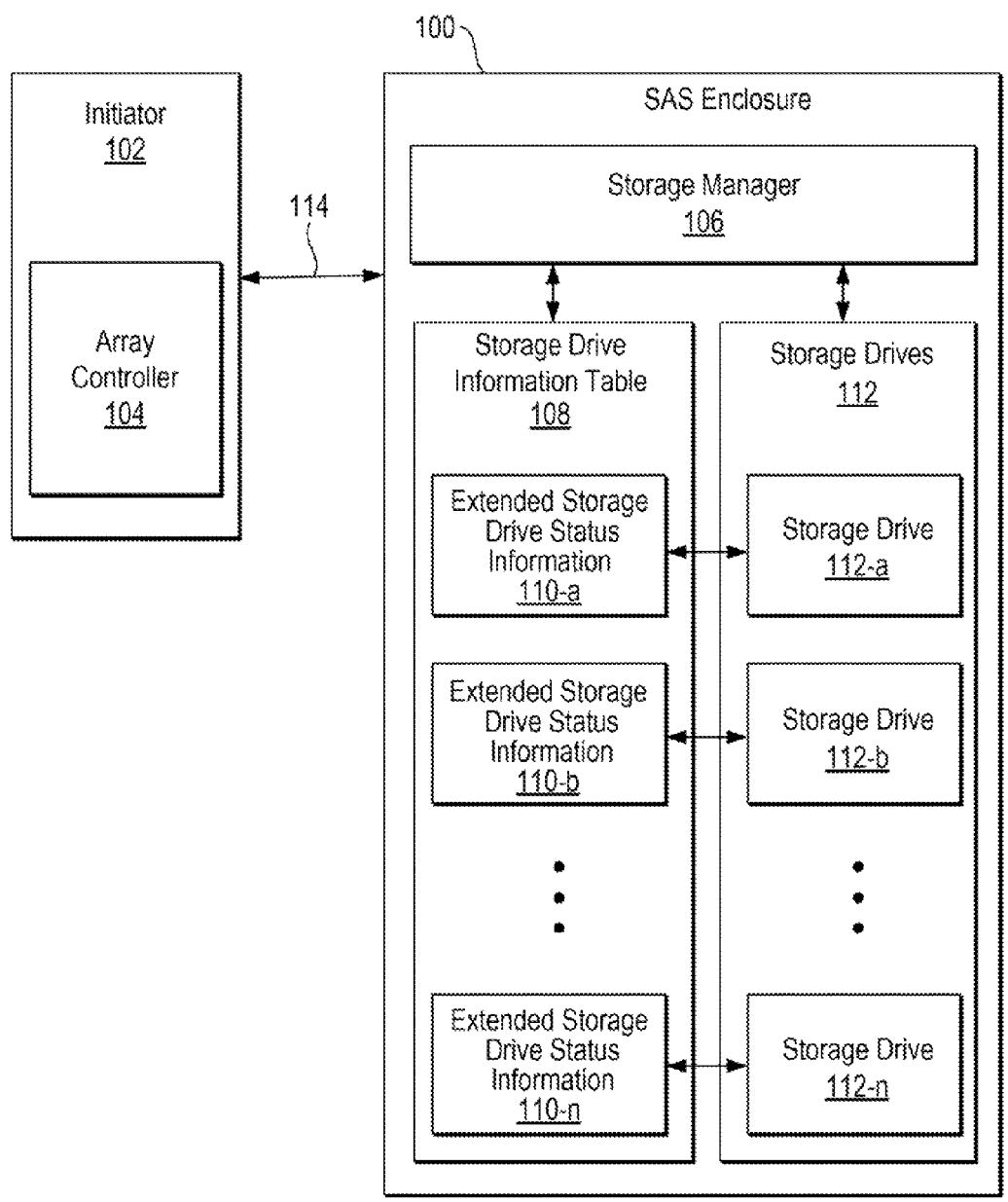
FIG. 1 is an example block diagram of a SAS enclosure to provide storage drive information.

As explained above, SAS is a communication protocol for enabling communication between SAS enabled devices over a SAS fabric. A SAS fabric can include a plurality of initiators coupled to targets such as storage systems which support storage drives. In one example, the initiators may be hosts that include host controllers or array controllers which can exchange data with corresponding targets such as SAS enclosures which are SAS enabled enclosures which support storage drives over a SAS fabric. The host controllers can be assigned or zoned to storage from a storage system such as from a SAS enclosure. A host during normal operation can exchange data with its corresponding zoned storage. The host can send SAS commands to write data to the storage and later send commands to retrieve the data from storage. However, during operation, a host may encounter a failure condition when communicating with storage such as a timeout condition because the storage drive failed to respond in a timely manner. The host may respond to this failure condition by sending a command to the SAS enclosure to indicate that a particular storage drive has encountered a failure. For example, the SAS enclosure may illuminate a light source such as a light emitting diode (LED) associated with the failed storage drive. However, the SAS enclosure may not be able to store extended storage drive status information, such as a timeout condition, regarding the failure of a particular storage drive for later retrieval by the host or other SAS initiator device.

This present application describes techniques for a SAS enclosure to provide extended storage drive status information regarding, for example, the failure of a particular storage drive. In one example, an initiator can have the SAS enclosure store extended information regarding the failure of a particular storage drive for later retrieval by a host or other SAS initiator device. This may allow for centralized storage and retrieval of such information from the SAS enclosure. This centralized means of storage and retrieval of information may help reduce the need to have the information stored at each initiator and then to have to retrieve the information from each initiator. Having a centralized means of providing extended storage drive information may help reduce the need to install agent applications on each initiator to provide this information. This may help improve setup time of the system and help users, such as administrators of the system, to more quickly isolate issues related to storage such as failures of storage drives.

The techniques of the present application may provide advantages. For example, a user or administrator of a system may request extended storage drive status information of storage drives using management protocols such as simple network management protocol (SNMP), storage management initiative-specification (SMIS) techniques and the like. This may require a user to configure, for example, an SNMP agent application on each initiator in a SAS fabric to collect the storage information. The techniques of the present application may help simplify this process by allowing a centralized agent, such as a SAS switch other SAS device, to collect the extended storage drive status information and distribute or publish that information using management protocols such as SNMP, SMIS and the like.

FIG. 1 is an example block diagram of a SAS enclosure 100 to provide storage drive information. The SAS enclosure 100 is coupled to a SAS fabric which may include a network of SAS protocol enabled devices including an initiator 102 capable of communication over a communication channel 114. The SAS enclosure 100 includes a storage drive information table 108 for storing extended storage drive status information 110-a through 110-n associated with respective storage drives 112-a through 112-n. The SAS enclosure 100 includes a storage manager 106 for managing the exchange of SAS commands and data between storage drives 112 and initiator 102. As explained below in further detail, SAS enclosure 100 can allow initiator 102 to store extended storage drive status information, such as a timeout condition indicating that a storage drive did not respond in a timely manner, to table 108 and to later retrieve the information from the table.

The SAS enclosure 100 can include any SAS enabled data processing device capable of implementing the functionality of the present application. For example, the SAS enclosure 100 can be a SAS enabled enclosure which can support storage drives over a SAS fabric. The SAS enclosure 100 can include a storage enclosure processor (SEP) in accordance with SAS protocol and standard to implement the functionality of storage manager 106. The SAS enclosure 100, and its components such as storage manager 106, can employ a protocol such as SCSI enclosure services (SES), including version SES-2, which is incorporated herein in its entirety. In SES, an initiator, such as initiator 102, can communicate with SAS enclosure 100 using a specialized set of SCSI commands to access power, cooling, and other non-data characteristics. As explained below in further detail, the techniques of the present application employ SES-2 commands including SAS Send Diagnostic and SAS Receive Diagnostic Results commands directed to elements of SAS enclosure 100 to store and retrieve extended storage drive status information.

The storage manager 106 can include functionality to facilitate communication with initiator 102 over communication channel 114. The communication channel 114 can facilitate communication over a SAS fabric and can employ SAS protocols and include SAS commands and messages with information and data about initiator 102 and storage drives 112. For example, initiator 102 can be assigned to particular storage drives 112 and then the initiator can send to storage manager 106 SAS commands to store data to particular storage drives. The storage manager 106 can also receive SAS commands from initiator 102 to retrieve data from storage drives 112 which have been assigned to the initiator. The storage manager 106 can be part of a SAS expander which can support communication functions with storage drives including zoning of storage drives to initiators.

The storage manager 106 can include functionality to handle from initiator 102 commands to store extended storage drive status information 110 to storage drive information table 108. For example, initiator 102 may encounter a failure condition with a storage drive, such as storage drive 112-$a$ when exchanging data with the storage drive. In one example, initiator 102 may have sent storage manager 106 a command to store data to storage drive 112-$a$, but the storage drive may have not responded to the initiator in a timely manner. In this case, initiator 102 may interpret this situation as a failure condition such as a storage drive timeout condition. The initiator 102 can respond by sending to storage manager 106 a SAS command to indicate that the initiator encountered a failure condition for storage drive 112-$a$. In one example, initiator 102 can send a SAS command to store in table 108 extended storage drive information 110-$a$, which can include failure information indicating a failure condition such as a storage drive timeout condition. In another example, initiator 102 can send a SAS SEND DIAGNOSTICS command which includes a request fault indication field which is set to indicate failure of a storage drive, in this case, storage drive 112-$a$. The SAS SEND DIAGNOSTICS command can be part of the SES-2 standard which is incorporated by reference herein in its entirety.

In another example, initiator 102 can send a SAS SEND DIAGNOSTICS command and fill in ARRAY DEVICE SLOT element information for the SAS enclosure. Furthermore, the request fault indication field can include a RAST FAULT bit (byte 3, bit 5) which initiator 102 can set to a value of 1 to indicate a failure condition associated with a particular storage drive 112. In another example, initiator 102 can clear a failure condition indication associated with a storage drive 112 by sending to storage manager 106 a command with request fault indication field such as RQST FAULT bit (byte 3, bit 5) set to a value of 0. The storage manager 106 can respond by clearing the failure condition indication which can include clearing the contents of an extended storage drive status information 110 entry associated with the respective storage drive 112.

In another example, initiator 102 can send a SAS SEND DIAGNOSTICS command to instruct storage manager 106 to provide a visual indication of failure of a storage drive, in this case, storage drive 112-$a$. The visual indication can include having storage manager 106 illuminate a light source such as a LED associated with the failed storage drive, in this case, storage drive 112-$a$. In another example, the SAS command from initiator 102 to store the information can include an index to an entry in storage drive information table 108 to store information of a failed storage drive, in this case storage drive 112-$a$. The index can provide an identifier associated with the storage information entry in table 108 and respective storage drive 112. In one example, the index can be an ARRAY DEVICE SLOT element index as specified by the SES-2 protocol.

The storage manager 106 can include functionality to handle from initiator 102 commands to retrieve extended storage drive information 110 from storage drive information table 108. For example, initiator 102 can send to storage manager 106 a SAS command to retrieve extended storage drive information 110 from storage drive Information table 108. In one example, the SAS command from initiator 102 to retrieve the information may includes a SAS RECEIVE DIAGNOSTICS RESULTS command which includes an index to an entry in storage drive information table 108 to retrieve the information of a failed storage drive from the table. In another example, initiator 102 can retrieve ARRAY DEVICE SLOT element information from storage enclosure 100 using RECEIVE DIAGNOSTIC RESULTS information. When the element status is returned for each ARRAY DEVICE SLOT element, a specific bit may be specified to indicate that extended storage drive status information (i.e., additional proprietary storage drive status information) is available. If extended storage drive status information is available, initiator 102 can request this information using proprietary commands that include indexing using the ARRAY DEVICE SLOT element index. The SAS RECEIVE DIAGNOSTICS RESULTS command can be part of the SES-2 protocol which is incorporated by reference herein in its entirety. In one example, the index can be an ARRAY DEVICE SLOT element index as specified by SES-2 protocol. In one example, initiator 102 can send a SAS RECEIVE DIAGNOSTICS RESULTS command and can fill in ARRAY DEVICE SLOT element information for the SAS enclosure in accordance with SES-2 protocol.

The storage drive information table 108 comprises an array of data entries that include extended storage drive status information 110-$a$ through 110-$n$ associated with respective storage drives 112-$a$ through 112-$n$. The extended storage drive information 110 can include any information related to storage drives 112. The storage drive information table 108 can be stored in a SAS expander and can support communication functions with storage drives including zoning of storage drives to initiators. The table 108 can include mapping between an ARRAY DEVICE SLOT element index and entries in table 108 such as extended storage drive status information 110. The SAS SEND DIAGNOSTICS command can include an element index which can be mapped to an ARRAY DEVICE SLOT element of a drive bay of SAS enclosure 100. In one example, extended storage drive information 110 can include information related to status or failure conditions of storages drives 112. For example, a failure condition of a storage drive may be defined as a condition that impacts the operation of a storage drive such that the storage drive may no longer be able to operate at an acceptable level of performance. For example, extended storage drive information 110 can include information of storage drives such as storage drive timeout information, storage drive media error information and storage drive read capacity information, and the like. In particular, storage drive timeout information may include information about a storage drive that did not respond to an initiator command or request in a timely manner or not all. In particular, storage drive media error information may include information about storage drive and an error with the media of the storage drive such as areas of the media that may have encountered an error. In particular, storage drive read capacity information may represent information related to amount of remaining data capacity of a particular storage drive.

The initiator 102 can include a SAS enabled data processing device capable of communicating over a SAS fabric employing SAS protocols over SAS communication channel 114. The initiator 102 can be any SAS enabled data processing device such as a server computer, personal computer, SAS switch and the like. The initiator 102 can be configured to provide processing functionality to support the initiator. For example, initiator 102 can include a storage controller such as an array controller 104 for managing storage arrays. Initiator 102 can be an SAS enabled initiator device capable of generating multiple commands sent to SAS enclosure 100 and directed to storage resources associated with multiple targets. For example, Initiator 102 can be assigned (zoned) storage resources such as storage drive 112-a from storage enclosure 100. Once storage is assigned, initiator 102 can generate and send to SAS enclosure 100 commands to store data and retrieve data from storage drive 112-a. The array controllers can comprise storage controllers such as disk array controllers which can manage physical disk drives and present them to the servers as logical units. In some examples, array controllers can implement RAID functionality and may be referred to as RAID controllers. Although one initiator 102 is shown, it should be understood that the techniques of the present application can be implemented with a plurality of initiators.

The SAS enclosure 100 is shown supporting a storage system comprising a plurality of storage drives 112-a through 112-n. Although one enclosure 100 is shown, it should be understood that the techniques of the present application can be applied to a plurality of enclosures and sub-enclosures. The storage drives 112 may be part of a storage system which may include SAS enabled data processing device capable of managing storage resources and with functionality for storage of data and subsequent retrieval by an initiator such as initiator 102. In one example, storage system may include storage drive bays which may contain one more of a non-volatile memory, a volatile memory, and/or one or more storage devices such as storage drives, such as disk drives, solid state drives, optical drives, tape drives, and the like. As explained above, SAS enclosure 100, and its components such as storage manager 106, can employ SES protocols, including version SES-2, which is incorporated by reference herein in its entirety.

The configuration of the SAS fabric of FIG. 1 is for illustrative purposes and it should be understood that a different configuration can be employed to implement the techniques of the present application. For example, the functionality of storage manager 106 is shown as part of SAS enclosure 100, however, it should be understood that other configurations are possible. For example, the functionality of storage manager 106 can be distributed among a plurality of devices located locally, remotely or a combination thereof. The functionality of SAS enclosure 100 and its components can be implemented in hardware, software, or a combination thereof. The techniques of the present application are shown as part of SAS fabric architecture, however, it should be understood that the techniques of the present application can be applicable in other architectures such as Storage Area Networks (SAN), Direct Attached Networks (DAN) or other network architectures. FIG. 1 shows initiator 102 coupled to SAS enclosure 100 to provide storage information to the initiator However, it should be understood that other SAS enabled devices can be used to perform this functionally. For example, SAS enclosure 100 may include a chassis with drive bays for supporting storage drives. The SAS enclosure 100 can include management devices and one or more SAS expanders where the expanders can perform the functionality described herein. The storage manager 106 functionality can be part of the one or more SAS expanders. Although a single initiator 102 is shown coupled to SAS enclosure 100, it should be understood that other configurations are possible. For example, a plurality of initiators 102 can be coupled to SAS enclosure 100. In another example, other SAS devices, such as SAS expanders and SAS switches, can be coupled to SAS enclosure 100, alone or in combination with initiator 102 and SAS enclosure 100.

Figure 2:
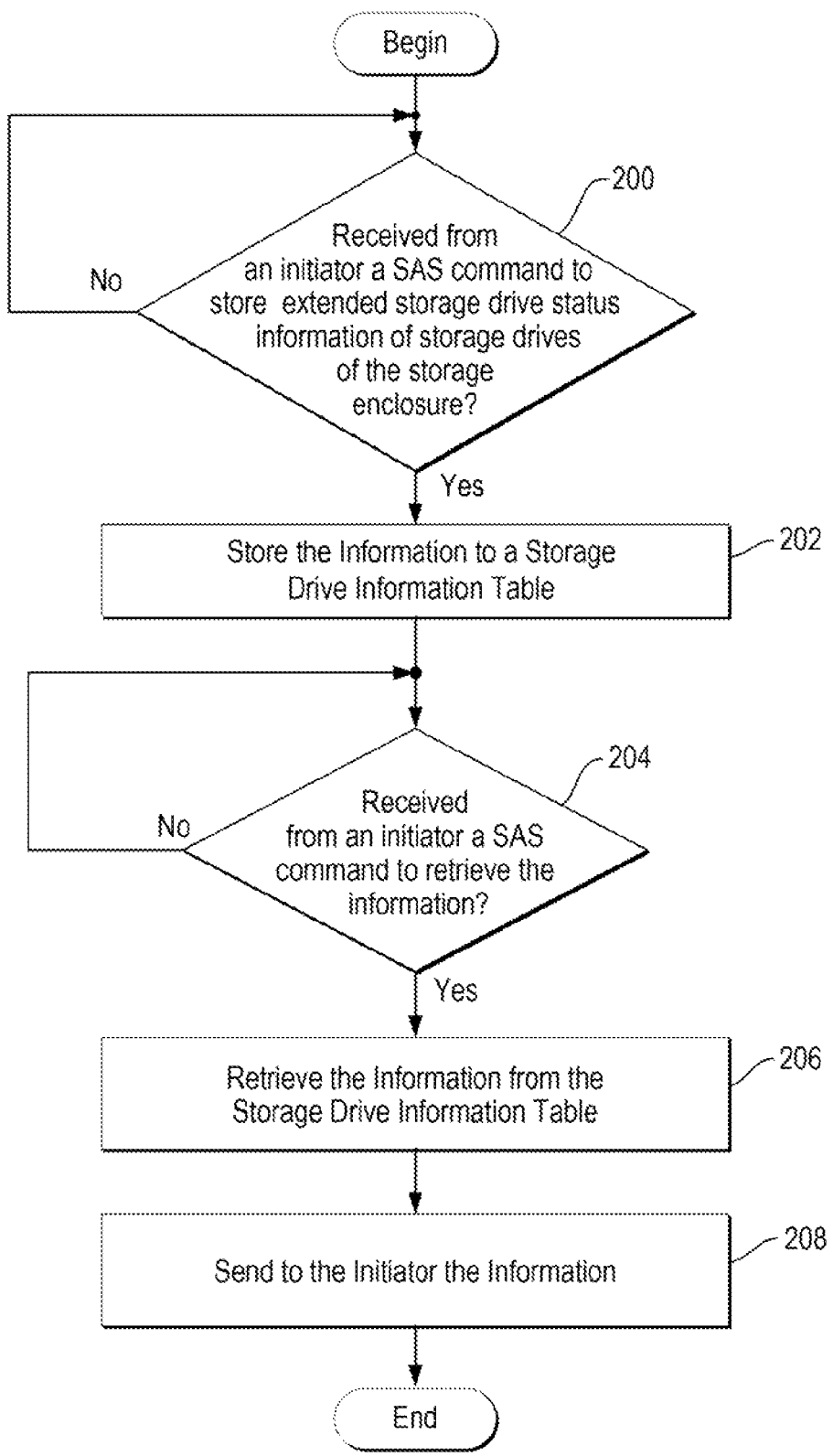
FIG. 2 is an example process flow diagram of a method for a SAS enclosure to provide storage drive information.

FIG. 2 is an example process flow diagram of a method for a SAS enclosure to provide storage drive information.

To illustrate, in one example, it will be assumed that initiator 102 is coupled to SAS enclosure 100 over communication channel 114 as shown in FIG. 1. It can be further assumed that initiator 102 is zoned to storage drive 112-a and that the initiator can exchange data with the storage drive. It can be further assumed, that during operation, storage drive 112-a experiences a failure condition. In response, initiator 102 sends to SAS enclosure 100 commands to store information related to the failure and later sends commands to retrieve the stored information from the SAS enclosure.

The method may begin at block 200, where SAS enclosure 100 checks whether it has received from initiator 102 a SAS command to store extended storage drive status information associated with storage drives 112. Continuing with the above example, to illustrate, it was assumed that initiator 102 encountered a failure condition with storage drive 112-a when the initiator was exchanging data with this particular storage drive. For example, initiator 102 may have sent to SAS enclosure 100 a command to store data to storage drive 112-a; however, the storage drive may have not responded to the initiator in a timely manner. In this case, initiator 102 interprets this situation as a failure condition such as a storage drive timeout condition. The initiator 102 can respond by sending to SAS enclosure 100 a SAS command to indicate that the initiator encountered a failure condition associated with storage drive 112-a. In one example, initiator 102 can send to SAS enclosure 100 a SAS command to store extended storage drive information including failure information indicating a failure condition such as a storage drive timeout condition. In other words, in the event that storage manager 106 receives from initiator 102 a command to exchange data with a zoned storage drive, such as storage drive 112-a, and then a storage drive failure occurs with the zoned storage drive, then initiator can send a command to storage manager to store failure information of the failed drive. The initiator 102 can send a SAS SEND DIAGNOSTICS command which includes a request fault indication field which is set to indicate failure of a storage drive, in this case, storage drive 112-a. In another example, initiator 102 can send a SAS SEND DIAGNOSTICS command to instruct SAS enclosure 100 to provide a visual indication of failure storage drive 112-a. The storage manager can respond to the visual indication by illuminating a light source such as a LED associated with the failed storage drive, in this case, storage drive 112-a. In another example, the SAS command from initiator 102 to store the information includes an index to an entry in storage drive information table 108 to store information of a failed storage drive, in this case storage drive 112-a. The index provides an identifier associated with the particular failed storage drive, in this case storage drive 112-a. Once storage manager 106 receives from initiator 102 a command to store extended storage drive information for a failed drive, processing proceeds to block 202 to have storage manager 106 process further the command.

On the other hand, if initiator 102 did not encounter a failure condition when the initiator was exchanging data with a particular storage drive, then processing proceeds back to block 200 to have storage manager 106 continue to monitor for receipt of a command from the initiator.

At block 202, SAS enclosure 100 stores the extended storage drive status Information 110 to storage drive Information table 108. To continue with the above example, storage manager 106 stores extended storage drive status information 110-a, which is associated with storage drive 112-a, to storage drive Information table 108. In this case, extended storage drive information 110-a indicates a failure condition such as storage drive timeout condition experienced by initiator 102 when communicating with storage drive 112-a. In addition, in another example, storage manager 106 can respond to the command by illuminating a light source such as an LED associated with the failed storage drive, in this case, storage drive 112-a. Once the SAS enclosure 100 stores the relevant Information to storage drive Information table 108, processing proceeds to block 204 where SAS enclosure 100 checks for receipt of a SAS command from initiator 102 to retrieve information 110 from storage drive Information table 108.

At block 204, SAS enclosure 100 checks for receipt of a SAS command to retrieve extended storage drive status information 110 from storage drive Information table 108. If SAS enclosure 100 receives a SAS command to retrieve information 110 from storage drive Information table 108, then processing proceeds to block 206 where SAS enclosure 100 retrieves the requested information 110 from storage drive information table 108. To continue with the above example, to illustrate, it was assumed that initiator 102 encountered a failure condition associated with storage drive 112-a when the initiator was exchanging data with this particular storage drive. The initiator 102 sent a SAS SEND DIAGNOSTICS command to have storage manager 106 store to table 108 extended storage drive information 110-a associated with failed storage drive, in this case storage drive 112-a.

It can be further assumed, to continue with the example, that initiator 102 sends to storage manager 106 a SAS command to retrieve extended storage drive information 110-a associated with storage drive 112-a from storage drive Information table 108. In one example, the SAS command from the initiator to retrieve the information includes a SAS RECEIVE DIAGNOSTICS RESULTS command which includes an index to an entry in storage drive information table 108 to retrieve the information of a failed storage drive from the table. The index provides an identifier associated with the particular failed storage drive, in this case storage drive 112-a.

On the other hand, if SAS enclosure 100 does not receives a SAS command to retrieve information 110 from storage drive Information table 108, then processing proceeds back to block 204 where SAS enclosure 100 continues to check for receipt of a SAS command to retrieve information from storage drive Information table 108.

At block 206, SAS enclosure 100 retrieves the Information from storage drive information table 108. Continuing with the above example, it can be further assumed, that storage manager 106 retrieves extended storage drive status information 110-a from storage drive Information table 108. Once storage manager 106 retrieves the Information from storage drive information table 108, processing proceeds to block 208 where SAS enclosure 100 sends the retrieved information to Initiator 102.

At block 208, SAS enclosure 100 sends the retrieved information to initiator 102. Continuing with the above example, it can be further assumed, that storage manager 106 retrieved extended storage drive information 110-a from storage drive Information table 108. Then, storage manager 106 sends to initiator 102 the retrieved extended storage drive information 110-a. In one example, storage manager 106 can send the retrieved extended storage drive information 110-a in as part of a SAS message in response to the SAS RECEIVE DIAGNOSTICS RESULTS command. Once storage manager 102 sends retrieved information to Initiator 102, the processing can terminate or proceed back to block 200 to have SAS enclosure 100 continue to check for receipt of a SAS command to store extended storage drive information of storage drives.

The above described an example process for providing extended storage drive statue information from a SAS enclosure. However, it should be understood that the example is for illustrative purposes and that other examples are possible. For example, the above showed initiator 102 being zoned or assigned to storage drive 112-a. However, it should be understood that the techniques of the present application can be applied to other configurations that include having initiator 102 zoned or assigned to any one of storage drives 112 as well as more than one of the storage drives. For example, initiator 102 can be zoned to several storage drives, such as storage drive 112-c and storage drive 112-d, and be capable of storing and retrieving extended storage information related to both storage drives.

The above described techniques for providing extended storage drive information from a SAS enclosure may provide advantages. For example, these techniques may allow for centralized storage and retrieval of extended storage drive information from the SAS enclosure. This centralized means of storage and retrieval of information may help reduce the need to have the information stored at each initiator and then have to retrieve the information from each initiator. Having a centralized means of providing storage drive information may help reduce the need to install agent applications on each initiator. This may help improve setup time of the system and help users, such as administrators of the system, to more quickly isolate issues related to storage such as failure of storage drives.

The techniques of the present application may provide other advantages. For example, a user or administrator of a system with SAS enclosure 100 could request status information of storage drives using management protocols such as SNMP, SMIS and the like. This would require a user to configure, for example, an SNMP agent application on each initiator in a SAS fabric to collect the storage information. The techniques of the present application may help simplify this process by allowing a centralized agent, like a SAS switch or other SAS enabled device, to collect extended drive status information and publish that information via management protocols such as SNMP, SMIS and the like.

Figure 3:
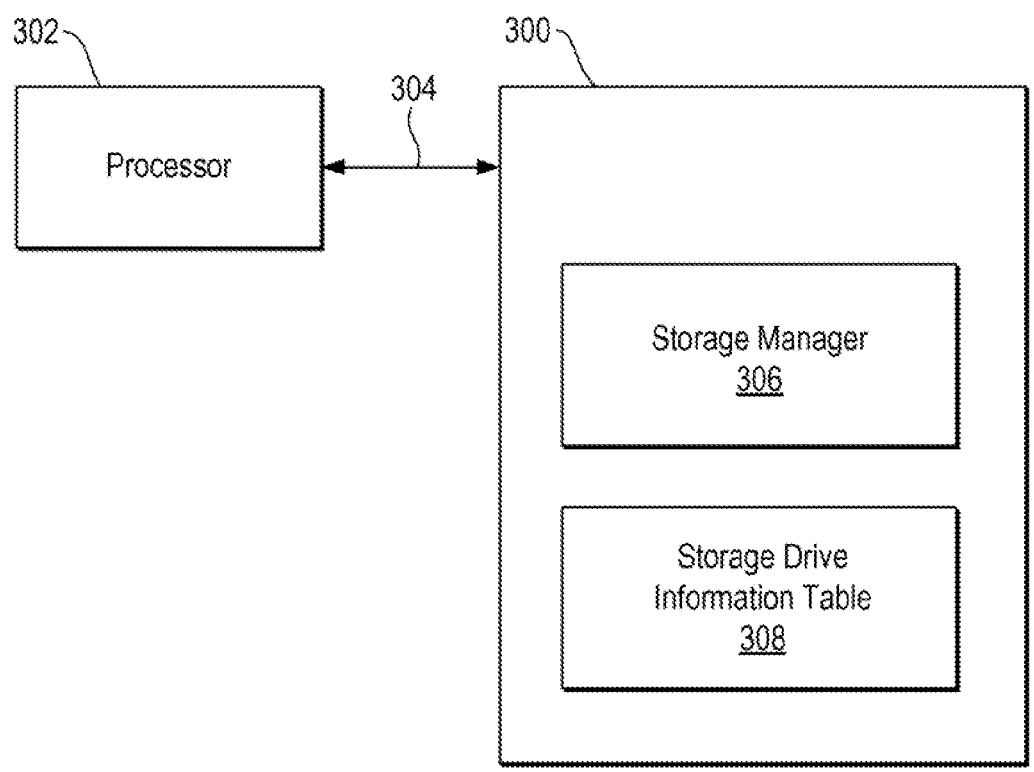
FIG. 3 is an example block diagram showing a non-transitory, computer-readable medium that stores instructions for a SAS enclosure to provide storage drive information.

FIG. 3 is an example block diagram showing a non-transitory, computer-readable medium that stores code for operating a SAS enclosure to provide storage drive information. The non-transitory, computer-readable medium is generally referred to by the reference number 300 and may be included in SAS enclosure 100 of the SAS fabric described in relation to FIG. 1. The non-transitory, computer-readable medium 300 may correspond to any typical storage device that stores computer-implemented instructions, such as programming code or the like. For example, the non-transitory, computer-readable medium 300 may include one or more of a non-volatile memory, a volatile memory, and/or one or more storage devices. Examples of non-volatile memory include, but are not limited to, electrically erasable programmable read only memory (EEPROM) and read only memory (ROM). Examples of volatile memory include, but are not limited to, static random access memory (SRAM), and dynamic random access memory (DRAM). Examples of storage devices include, but are not limited to, hard disk drives, compact disc drives, digital versatile disc drives, optical drives, solid state drives and flash memory devices.

A processor 302 generally retrieves and executes the instructions stored in the non-transitory, computer-readable medium 300 to operate the SAS enclosure in accordance with an example. In an example, the tangible, machine-readable medium 300 can be accessed by the processor 302 over a bus 304. A first region 306 of the non-transitory, computer-readable medium 300 may include functionality to implement storage manager 106 as described herein. A second region 308 of the non-transitory, computer-readable medium 300 may include storage drive information table 108 functionality as described herein.

Although shown as contiguous blocks, the software components can be stored in any order or configuration. For example, if the non-transitory, computer-readable medium 300 is a hard drive, the software components can be stored in non-contiguous, or even overlapping, sectors.

What is claimed is:

1. A SAS storage enclosure, comprising:
   an expander to support communication between initiators and associated zoned storage drives of the storage enclosure, and having a storage drive information table to store extended storage drive status information of storage drives of the storage enclosure; and
   a storage manager inside of the SAS storage enclosure to:
   in the event that the storage manager receives from a host initiator outside of the SAS storage enclosure a command to exchange data with a zoned storage drive and then a storage drive failure occurs with the zoned storage drive, store to the storage drive information table extended storage drive status information of the failed storage drive of the storage enclosure in response to the storage manager receiving from the host initiator a SAS command to store the information, and
   send to the host initiator the information in response to receipt from the host initiator a SAS command to retrieve the information.

2. The storage enclosure of claim 1, wherein the SAS command from the host initiator to store the information comprises a SAS SEND DIAGNOSTICS command which includes a request fault indication field which is set to indicate failure of a storage drive.

3. The storage enclosure of claim 1, wherein the SAS command from the host initiator to store the information comprises a SAS SEND DIAGNOSTICS command which includes providing a visual indication of failure of a storage drive.

4. The storage enclosure of claim 1, wherein the SAS command from the host initiator to store the information includes an index to an entry in the storage drive information table to store information of a failed storage drive.

5. The storage enclosure of claim 1, wherein the SAS command from the host initiator to retrieve the information includes a SAS RECEIVE DIAGNOSTICS RESULTS command which includes an index to an entry in the storage drive information table to retrieve the information of a failed storage drive from the table.

6. The storage enclosure of claim 1, wherein the extended storage drive status information includes failure information of a failed storage device which includes at least one of storage drive timeout information, storage drive media error information and storage drive read capacity information.

7. The storage enclosure of claim 1, wherein the storage manager communicates SAS commands with an array controller of the host initiator over a SAS fabric.

8. A method implemented for storage drives of a SAS storage enclosure, comprising:
   if a storage manager inside of the SAS storage enclosure receives from an initiator outside of the SAS storage enclosure a command to exchange data with a zoned storage drive and then a storage drive failure occurs with the zoned storage drive, receiving at the storage manager a SAS command from the initiator to store extended storage drive status information of the failed storage drive of the storage enclosure;
   storing the information to a storage drive information table of the storage enclosure; and
   sending to the initiator the information in response to receipt of a SAS command from the initiator.

9. The method of claim 8, further comprising retrieving the information from the storage drive information table.

10. The method of claim 8, wherein the SAS command from the initiator to store the information comprises a SAS SEND DIAGNOSTICS command which includes a request fault indication field set to indicate failure of a storage drive.

11. The method of claim 8, wherein the SAS command from the initiator to store the information includes an index to an entry in the storage drive information table to store information of a failed storage drive.

12. The method of claim 8, wherein the SAS command from the initiator to retrieve the information includes a SAS RECEIVE DIAGNOSTICS RESULTS command which includes an index to an entry in the storage drive information table to retrieve the information of a failed storage drive from the table.

13. The method of claim 8, wherein the extended storage drive status information includes failure information of a failed storage device which includes at least one of storage drive timeout information, storage drive media error information and storage drive read capacity information.

14. The method of claim 8, wherein SAS commands are communicated with an array controller of an initiator over a SAS fabric.

15. A non-transitory computer-readable medium having computer executable instructions stored thereon for a SAS storage enclosure having a storage manager inside of the SAS storage enclosure, the instructions are executable by a processor to:
   receive a SAS command by the storage manager from an initiator outside of the SAD storage enclosure to store extended storage drive status information of a failed storage drive of the storage enclosure, if the storage manager receives from the initiator a command to exchange data with a zoned storage drive of the SAS enclosure and then a storage drive failure occurs with the zoned storage drive;
   store the information to a storage drive information table of the storage enclosure;
   receive from the initiator a SAS command to retrieve the information from the storage drive information table;
   retrieve the information from the storage drive information table; and
   send to the initiator the information in response to receipt of the SAS command from the initiator to retrieve the information from memory.

16. The non-transitory computer readable medium of claim 15, wherein the SAS command from the initiator to store the information comprises a SAS SEND DIAGNOSTICS command which includes a request fault indication field which is set to indicate failure of a storage drive.

17. The non-transitory computer readable medium of claim 15, wherein the SAS command from the initiator to store the information includes an index to an entry in the storage drive information table to store information of a failed storage drive.

18. The non-transitory computer readable medium of claim 15, wherein the SAS command from the initiator to retrieve the information includes a SAS RECEIVE DIAGNOSTICS RESULTS command which includes an index to an entry in the storage drive information table to retrieve the information of the failed storage drive from the table.

19. The non-transitory computer readable medium of claim 15, wherein the extended storage drive status information includes failure information of a failed storage device which includes at least one of storage drive timeout information, storage drive media error information and storage drive read capacity information.

20. The non-transitory computer readable medium of claim 15, wherein the SAS commands are communicated with an array controller of an initiator over a SAS fabric.

* * * * *

UNITED STATES PATENT AND TRADEMARK OFFICE
CERTIFICATE OF CORRECTION

PATENT NO.        : 8,898,514 B2                                    Page 1 of 1
APPLICATION NO.   : 13/532287
DATED             : November 25, 2014
INVENTOR(S)       : Michael G. Myrah et al.

It is certified that error appears in the above-identified patent and that said Letters Patent is hereby corrected as shown below:

On the Title page, in item (54), Title, and in the Specification, in column 1, line 1, delete "DEVICE DRIVE" and insert -- DRIVE --, therefor.

Signed and Sealed this
Twenty-eighth Day of April, 2015

Michelle K. Lee
*Director of the United States Patent and Trademark Office*